United States Patent [19]
Ito et al.

[11] 4,086,581
[45] Apr. 25, 1978

[54] EXPOSURE CONTROL APPARATUS

[75] Inventors: Fumio Ito; Tadashi Ito, both of Yokohama; Yukio Mashimo, Tokyo; Nobuaki Sakurada, Yokohama; Nobuhiko Shinoda, Tokyo, all of Japan

[73] Assignee: Canon Kabushiki Kaisha, Tokyo, Japan

[21] Appl. No.: 584,297

[22] Filed: Jun. 6, 1975

[30] Foreign Application Priority Data

Jun. 10, 1974 Japan .................................. 49-65823

[51] Int. Cl.² .............................................. G03B 7/08
[52] U.S. Cl. .................................... 354/23 D; 354/38; 354/50; 354/60 R
[58] Field of Search .................... 354/23 D, 24, 36, 37, 354/38, 50, 51, 60 R

[56] References Cited

U.S. PATENT DOCUMENTS

| | | | |
|---|---|---|---|
| 3,842,587 | 10/1974 | Strauss et al. | 354/23 D |
| 3,863,263 | 1/1975 | Itagaki | 354/60 |
| 3,900,855 | 8/1975 | Stempeck | 354/51 |
| 3,903,528 | 9/1975 | Kee | 354/51 |
| 3,928,858 | 12/1975 | Sakurada et al. | 354/23 D |

*Primary Examiner*—Russell E. Adams
*Attorney, Agent, or Firm*—Toren, McGeady and Stanger

[57] ABSTRACT

An exposure control apparatus for a photographic camera wherein various exposure control parameters after being digitized are applied to a computer. The computer then derives an exposure value based on digital computation. The apparatus is provided with combined means for converting the preselected exposure control parameters to corresponding mechanical displacements and for converting the displacements directly to corresponding numbers of pulses, whereby the computer is made responsive to the numbers of pulses.

5 Claims, 3 Drawing Figures

EXPOSURE CONTROL APPARATUS

BACKGROUND OF THE INVENTION

1. Field of the Invention

This invention relates to photographic cameras, and more particularly to an automatic exposure control apparatus having a digital computer to which various exposure control parameters are applied after being digitized.

2. Description of Prior Art

It is known to provide an automatic exposure control apparatus for controlling either the exposure time or the exposure aperture size of a camera in such a manner that various exposure control parameters are converted to digital signals which are then applied to a digital computer cooperating with the shutter and diaphragm mechanisms of the camera. It is also known, for example, in controlling the aperture size of the lens aperture mechanism in accordance with the output pulse of the digital computer as derived in conformance with the preselected exposure control parameters such as shutter speed, film sensitivity and object brightness level, to convert ever varying actual aperture sizes of the lens aperture mechanism to corresponding resistance values of a variable resistor, then upon application of a voltage on the resistor to convert the resistance values to analog electrical signals, then to convert the analog signals to digital signals by use of an analog-to-digital converter, and finally upon attainment of the digital signals to a level dependent upon the output of the computer to arrest the lens aperture mechanism, whereby the resultant exposure aperture size is adjusted in conformance with the output of the computer. Such an exposure control has drawbacks in that the necessity of the analog-to-digital converter increases the complexity of the electrical circuitry of the exposure control apparatus which in turn causes an increase in the bulk of the apparatus itself. These drawbacks become serious when designing compact, low-cost cameras with exposure control apparatus of the character described.

SUMMARY OF THE INVENTION

An object of the present invention is to provide an automatic exposure control apparatus for a photographic camera of the type in which various exposure control parameters after being digitized are applied to a computer which derives an exposure value, said apparatus being characterized by having combined means for converting at least one of the exposure control parameters to a mechanical displacement and for converting said mechanical displacement directly to a corresponding number of pulses, whereby said computer is made responsive to the pulse number.

Another object of the present invention is to provide an automatic exposure control apparatus of the character described wherein when said computer is made responsive to the pulse number representative of shutter speed as in the shutter speed preselection automatic exposure aperture control mode, the aperture size of the camera is controlled in accordance with the output of said computer, and when said computer is made responsive to the pulse number representative of exposure aperture size as in the exposure aperture preselection automatic shutter speed control mode, the shutter speed of the camera is controlled in accordance with the output of said computer, and wherein in addition to the both exposure control modes, the camera is enabled to afford a manual exposure control mode.

Still another object of the present invention is to provide an automatic exposure control apparatus of the character described having means for indicating the automatically determined exposure value.

According to a preferred embodiment of the invention, the exposure aperture size control mechanism of the camera is provided with digital signal forming means arranged upon movement of the diaphragm blades from the maximum open position to the closed position to produce electrical digital signals corresponding to ever varying actual aperture sizes, whereby the shutter speed, or aperture size can be controlled without the necessity of using analog signal forming means arranged between the exposure aperture control mechanism and the digital signal forming means. This feature facilitates the minimization of bulk and production cost of the overall apparatus.

Other objects, features and advantages will become apparent from the following detailed description taken in conjunction with the accompanying drawings in which:

DETAILED DESCRIPTION OF THE PREFERRED EMBODIMENT

Figure 1:
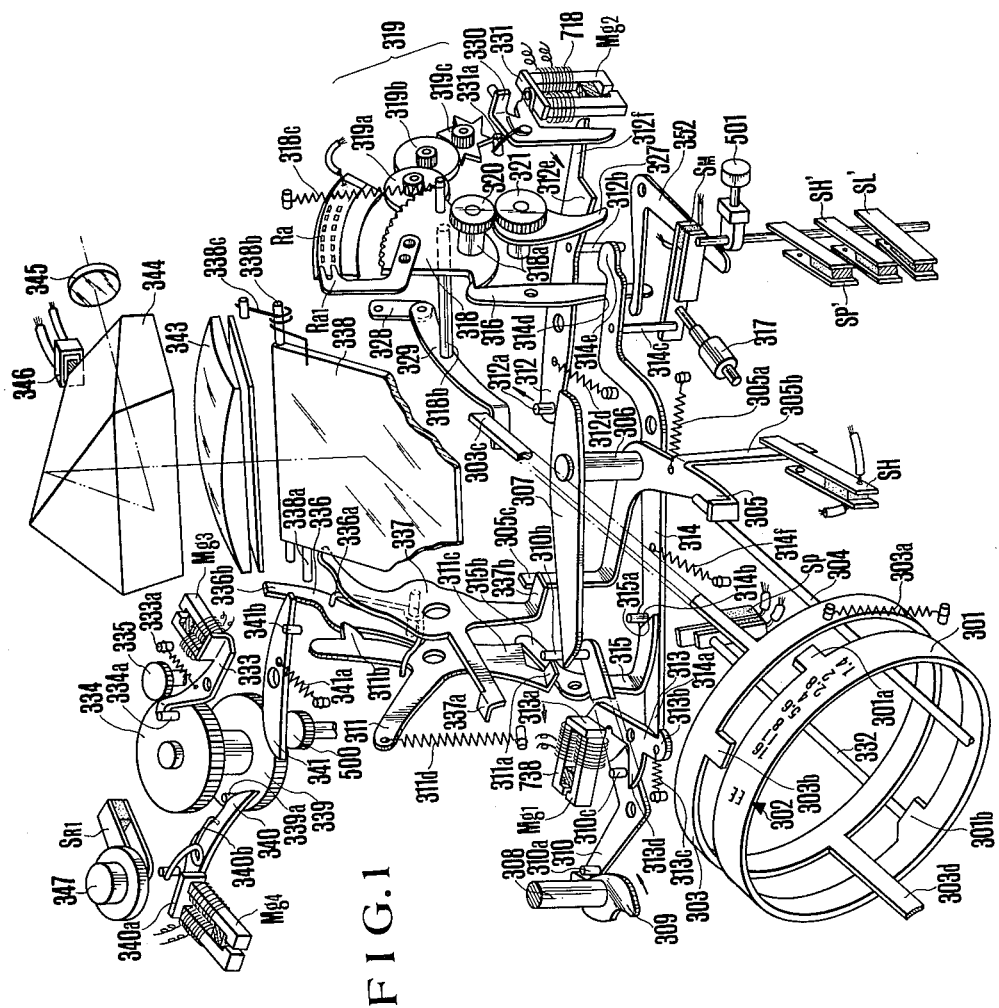
FIG. 1 is an exploded perspective view of one embodiment of an automatic exposure control apparatus according to the present invention, with its diaphragm control mechanism being associated with digital signal forming means.

Referring to FIG. 1, there is shown one embodiment of an automatic exposure control apparatus according to the present invention as applied to a single lens reflex camera. The apparatus is assumed in the film wound and shutter cocked position, and is shown as essentially comprising a lens aperture mechanism mounted in an individual interchangeable objective lens barrel, a diaphragm control mechanism for adjusting the lens aperture mechanism to a manually preselected or automatically determined setting, a mirror mechanism movable between viewing and non-viewing positions, a shutter mechanism and film winding mechanism, each of which will now be described.

The lens aperture mechanism comprises a manually rotatable diaphragm preselecting ring 301 having cut thereon a symbol EE indicative of the shutter preselection automatic exposure control mode and a diaphragm scale of which the graduations each can be brought into registry with a stationary index 302, and having a stop lug 301a and a cam lobe 301b, and an automatically rotatable diaphragm presetting ring 303 which is biased by a spring 303a in a clockwise direction and which has a lug 303b movable into engagement with the stop lug 301a. The diaphragm presetting ring 303 is provided with first and second arms 303c and 303d which extend parallel to the optical axis of the objective lens rearwardly and forwardly respectively. The position of the second arm 303c determines the position of a not shown bell crank member through a not shown cam ring, which in turn determines the amount of movement of a not shown ring member for the diaphragm blade assembly, thereby the size of the exposure aperture is adjusted in conformance to the preselected or automatically controlled setting of the diaphragm setting ring 303. The drive ring member has a pin 304 fixedly mounted thereon and rearwardly extending parallel to the optical axis of the objective lens into the path of movement of the drive lever 305 of the diaphragm control mechanism.

The diaphragm control mechanism includes the two-armed drive lever 305 for the lens aperture mechanism pivoted about a shaft 306 and biased in a counter-clockwise direction by a spring 305a which tends to urge an extension perpendicularly downwardly extending from the one of the arms of lever 305 engaging with pin 304 for operative engagement with a normally open switch or hold switch SH and to urge the upwardly rectangularly bent end portion 305c of the other arm for normally abutting engagement with a rectangularly bent portion 337b of a mirror control lever 337, and an escapement 312 which serves as a resetting member for the diaphragm presetting ring 303, when the cocking mechanism of the camera is operated, through a transmission which serves to convert ever varying actual aperture size settings into corresponding mechanical displacements during the time just before the front curtain runs down but after the shutter release button is depressed. This transmission comprises a gear sector 318 which is fixedly mounted on a rotatable shaft 318 and which is latched in the cocked position by a pawl lever 316, a pinion 320 fixedly mounted on the shaft 318a and meshing with a gear 321 fixedly mounted on a rotatable shaft 322, an arm 327 radially extending from the shaft 322 and engaging at the free end thereof with one arm of escapement 312, a diaphragm presetting ring control lever 329 pivoted at the free end of an arm 328, the opposite end thereof being rotatably mounted on the camera housing, and connected at the center to a pin 318 extending from gear sector 318 in eccentrically parallel relation to the shaft 318a and at the free end to the end of arm 303c of diaphragm presetting ring 303, and an arresting mechanism for the gear sector 318 comprising a gear train 319 and a pawl lever 330 which fixedly carries at one arm end an armature 331 arranged to cooperate with the solenoid of a permanent magnet $Mg_2$, and which is biased by a spring 331a in a counter-clockwise direction so that when the solenoid of magnet $Mg_2$ is energized to cancel the magnetic force of permanent magnet $Mg_2$, the pawl of lever 330 is brought into arresting engagement with one of the teeth of a star wheel 319c of gear train 319.

In order to convert the mechanical displacements of gear sector 318 into corresponding digital signals, there is provided switching means including a slider $Ra_1$ fixedly mounted on and radially extending from the gear sector 318 which will be in more detail described in connection with FIG. 3. In order to switch the diaphragm control mechanism between the automatic and manual exposure control modes, there is provided a change-over device comprising a detent pin 332 provided in the objective lens barrel and arranged to act as a cam follower on the cam lobe 301b and to cooperate at the opposite end thereof with a movable contact of a switch SP.

The mirror mechanism includes a mirror 338 pivotally mounted on a pair of stub shafts 338b and positioned between the objective lens and the two curtain type focal plane shutter. The mirror 338, in its viewing position as shown in FIG. 1, reflects light entering through the objective lens upwards onto a focusing screen 342 where an image of the object area to be photographed is formed. Light from the image on the screen 342 is radiated upward through a condenser lens 343 into the bottom face of a penta prism 344. The prism 344 reflects the light entering the bottom face thereof to an eye-piece 345 positioned behind the exit face of prism 344, whereby the image may be viewed through the eye-piece 345. There is also shown a light value sensing means such as a silicon blue cell 346 positioned adjacent the exit surface of prism 344 to receive light coming from the predetermined area of the image on the focusing screen 342.

The mirror 338 is movable between viewing and non-viewing positions by a control lever 337 pivotally mounted on a common shaft and of which the upwardly extending arm movably carries at the end portion thereof a stud 338a extending from the side of the support member of mirror 338. The mirror mechanism further includes a spring powered drive lever 311 pivotal about the common shaft of control lever 337 and pretensioned by a spring 311d which urges the lever 311 to move counter-clockwise and a mirror return control lever 336 which is pivoted at a pin mounted on mirror control lever 337 in eccentrically parallel relation to the common shaft thereof and which is biased by a spring 336a in a counter-clockwise direction to urge the lever 336 for engagement at an extension thereof with a pawl 311b of drive lever 311. So long as the lever 336 is engaged with the drive lever 311, the driving torque of lever 311 imparted by spring 311d is transmitted to the mirror control lever 337 and further therefrom to the diaphragm drive lever 305 through the extension 337b and extension 305c engagement.

The shutter mechanism comprises a focal plane shutter having front and rear curtains not shown which are controlled by gears 334 and 339 respectively coaxially mounted on a common shaft and meshing with pinions 335 and 500 fixedly mounted on respective shafts of front and rear curtain drums not shown. The gears 334 and 339 are held in the cocked position by front and rear curtain latch levers 333 and 340 respectively in engagement at their pawls with detent pins 334a and 339a respectively provided on gears 334 and 339. The latch lever 333 is biased by a spring 333a in a clockwise direction and is arranged to cooperate with a solenoid of a permanent magnet $Mg_3$ in such a manner that when the solenoid is energized to cancel the magnetic force of permanent magnet $Mg_3$, an armature mounted on the tail of latch lever 333 is permitted to move away from magnet $Mg_3$ under the action of spring 333a, thereby the pawl of lever 333 is disengaged from detent pin 334a. The latch lever 340 is biased by a spring 340b in a clockwise direction and is arranged to cooperate with a solenoid of a permanent magnet $Mg_4$ in such a manner that when the solenoid is energized to cancel the magnetic force of permanent magnet $Mg_4$, an armature 340a mounted on the tail of latch lever 340 is permitted to move away from magnet $Mg_4$ under the action of spring 340b, thereby the pawl of lever 340 is disengaged from detent pin 339a. In order to return the mirror 338 to the viewing position as soon as the rear curtain runs down to the closed position, there is provided a two-armed lever 341 which is biased by a spring 341a in a clockwise direction to urge one of the two arms for abutment with a stop pin 341b, the other arm of which extends into the path of movement of detent pin 339a of rear curtain control gear 339 at a location near the most-advanced end thereof, so that when detent pin 339a strikes the former arm of lever 341 to turn lever 341 in a counter-clockwise direction against the force of spring 341a, the latter arm of lever 341 strikes the end 336b of lever 336 to disengage the extension of lever 336 from the pawl 311b of mirror drive lever 311, thereby the control lever 337 is turned in the clockwise direction causing the mirror 338 to return to the viewing position.

The actuating mechanism for the mirror and diaphragm mechanisms includes a shutter release button 347, a switch $SR_1$ positioned adjacent the shutter button 347 upon depression of button 347 to be closed to energize a solenoid of a permanent magnet $Mg_1$, and a first latch lever 313 carrying an armature 313a arranged to cooperate with the magnet and solenoid $Mg_1$ and which lever 313 is biased by a spring 313c in a clockwise direction so that when the solenoid of magnet $Mg_1$ is energized to cancel the magnetic force of magnet $Mg_1$, first latch lever 313 is turned clockwise to disengage a pawl 313b of lever 313 from one end 314a of a release lever 314 which is biased by a spring 314f in a counter-clockwise direction. The release lever 314 is arranged upon actuation or disengagement from first latch lever 313 to release the mirror drive lever 311 and diaphragm control gear sector 318 from their cocked or locked positions through the respective intermediaries including second and third latch levers 315 and 316 respectively. The second latch lever 315 has a tapered portion 315a formed on the end of a rectangularly bent portion of one arm thereof and arranged for normal abutment with a pin 314]b mounted on the release lever 314, and has a pawl 315b formed on the end of the other arm thereof and arranged to be brought into engagement with a projection 311c of mirror drive lever 311 when the cocking mechanism is operated. The third latch lever 316 is arranged for abutting engagement at its tail with the one arm 314d of release lever 314 cooperating with the second latch lever 315. The tail of third latch lever 316 also engages with one arm of a transfer lever 352, the other arm of which cooperates with an exposure value indicator control switch 501. The release lever 314 further carries a perpendicularly downwardly extending pin 314c arranged to operate a normally closed switch SM into the open position each time the light value as photoelectrically sensed by the photocell 346 is stored. This switch SM is provided with an actuating member 317 accessible from the outside of the camera housing for the purpose of retaining a once stored light value until the next new exposure metering result is positively stored.

The film winding and shutter cocking mechanism includes a shaft 308 having a film winding lever not shown mounted at the top end thereof and having a cam disk 309 coaxially fixedly mounted on the bottom end thereof, and a bell crank lever 310 having a first pin 310a fixedly mounted at one end thereof and arranged to serve as a cam follower pin for the cam disk 309 and having a second pin 315b fixedly mounted at the other end thereof and arranged to be engageable with one end of an intermediate lever 307 pivoted at the shaft 306, the other end of which is engaged with a pin 312a mounted on the escapement 312, so that when lever 307 is turned counter-clockwise by bell crank lever 310, the escapement 312 is turned clockwise against the force of spring 312d until the sector 318 is set in the cocked position by the third latch lever 316 through the lever arm 327 and lever end 312e engagement, while the arresting lever 330 is disengaged from the star wheel 319c against the force of spring 331a. In order to transmit the cocking movement from escapement 312 to the release lever 314, there is provided a pin 312b perpendicularly downwardly extending from escapement 312 and arranged to be engageable with the end 314e of lever 314. In order to bring the first latch lever pawl 313b into engagement with the cocked release lever 314 against the force of spring 313c, there is provided a pin 310c fixedly mounted on bell crank lever 310 arranged to cooperate with one arm 313d of first latch lever 313. This cocking mechanism also serves as the mirror resetting mechanism through the connection of pin 310b with an extension 311a of mirror drive lever 311.

Figure 2:
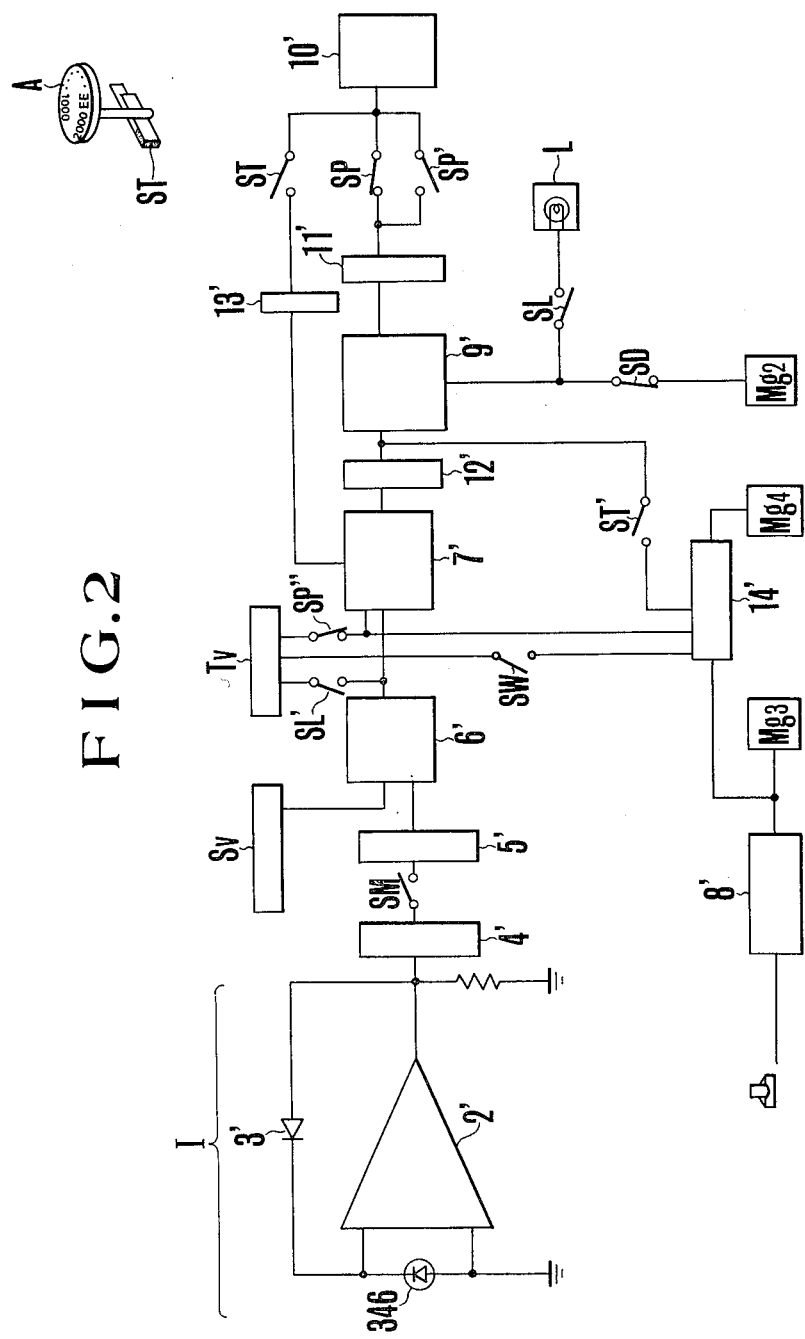
FIG. 2 is a block diagram showing the electrical circuitry of the apparatus of FIG. 1.

In FIG. 2, there is shown a schematic circuit arrangement for controlling the periods of actuation of the solenoids of permanent magnets $Mg_2$, $Mg_3$ and $Mg_4$ of the apparatus of FIG. 1. A light value sensor I is provided for obtaining a voltage proportional to the logarithm of the object brightness level and comprises a photosensitive element such as silicon blue cell 346 connected between the inputs of an operational amplifier 2', and a log diode 3' connected in the feedback circuit of amplifier 2'. The output of amplifier 2' is connected to an input of an analog-to-digital converter 4'. The output of converter 4' is connected through the switch SM to a register 5' having an output connected to an input of an adder 6' having another input connected to film speed setting means associated with digital signal forming means, $Sv$. There is shown a subtracter having two inputs, one of which is connected to the output of adder 6' and the other of which is selectively connected through the switch SP" to shutter speed setting means associated with logarithmic digital signal forming means $Tv$ when the camera is set in the shutter speed pre-selection automatic exposure control mode, and is selectively connected through a register 13' and the switch ST to the diaphragm value setting means associated with logarithmic digital signal forming means 10'. A register 12' is provided for storing the computed exposure value $Av$ or $Tv$ of the subtracter 7' when the exposure is made in the shutter or diaphragm preselection mode respectively. The digital signal from means 10' is applied through the manual switch SP to register 11' when the exposure is made in the shutter preselection mode. The outputs of registers 11' and 12' are connected to respective inputs of a comparator 9' so that when the outputs from registers 11' and 12' coincide with each other, the comparator 9' produces an output which is applied through the switch SD to the solenoid of the second magnet $Mg_2$. The initiation of energization of the solenoid of the third magnet $Mg_3$ is controlled by a delay circuit 8' in such a manner that the delayed time from the actuation of the shutter button is long enough to permit the complete pivoting movement of the reflex mirror 338. In synchronism with the initiation of energization of the solenoid of magnet $Mg_3$, a timing device 14' is rendered operative so that the solenoid of the fourth magnet $Mg_4$ is energized after the duration of a time interval dependent upon the preselected shutter speed or computed exposure value. A lamp L is connected to the output of comparator 9' through a switch SL cooperating with the switch SP'. The switches ST and ST' cooperate with each other. The switches SP', SL and SL' are associated with each other as shown in FIG. 1. The switch SW is closed when the exposure is made in the manual exposure control mode.

Figure 3:
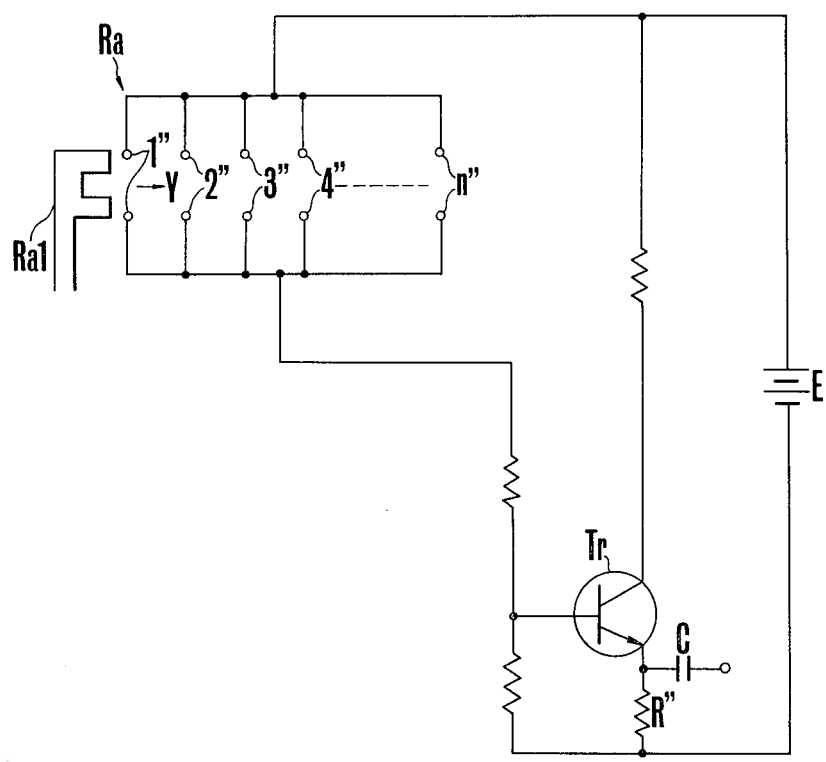
FIG. 3 is a schematic diagram of an example of an electrical circuitry usuable in the digital signal forming means of FIG. 1.

In FIG. 3, there is shown a digital pulse forming circuit suitable for use in block 10' of FIG. 2 and cooperative with the slide $Ra_1$ of FIG. 1. This circuit includes $n''$ number of pairs of contacts 1", 2", 3" . . . $n''$ arranged along the path of movement of slide $Ra_1$, so that each time one pair of contacts are connected with each other through slide $Ra_1$ as slide $Ra_1$ moves in the direction indicated by arrow Y, a transistor Tr having collector and base electrodes connected respective paired contacts produces an output in the form of one pulse appearing at the output terminal of a differentiating circuit connected to the emitter electrode of transistor Tr. The differentiating circuit contains a condenser C and a resistor R". E designates a battery.

THE OPERATION

In order to make an exposure in the shutter preselection automatic exposure control mode, the camera operator turns the diaphragm ring 301 to place symbol EE in registry with the index 302 as shown in FIG. 1, causing the cam follower pin 332 to ride on the cam lobe 301b, thereby switch SP is closed, to connect the digital pulse forming circuit to register 11', and at the same time the timing switch SP" and switch SD are closed. Next, the camera is aligned with an object to be photographed, a portion of the light entering through the objective lens is received by the light value sensing means 346 positioned behind the penta prism 344. Responsive to the level of brightness of the object, the sensor circuit I produces an analog output which is then converted by the analog-to-digital converter 4' to a number of pulses. When the shutter button 347 is depressed to close switch $SR_1$, the solenoid of the first magnet $Mg_1$ is energized to disengage the first latch lever pawl 313b from the release lever end 314a, thereupon the lever 314 is turned counter-clockwise under the action of spring 314f. Such a turning movement of release lever 314 causes the switch SM to be opened so that the light value is stored in the register 5', and causes a clockwise turning movement of the second latch lever 315, and further causes a counter-clockwise turning movement of the third latch lever 316.

As the third latch lever 316 is turned counter-clockwise, its pawl is disengaged from the projection of gear sector 318, permitting sector 318 to move clockwise under the action of spring 303a which overcomes the force of spring 318c connected between sector 318 and the camera housing. Such a turning movement of sector 318 causes a sliding movement of slider $Ra_1$ on the arrangement of contacts 1", 2", . . . , $n''$, while increasing the number of pulses produced in the pulse forming circuit 10' as the slider $Ra_1$ is brought into contact with the paired contacts one by one. On the other hand, the digital signal $Bv$ corresponding to the object brightness level and stored in register 5' is combined by the adder 6' with a digital signal $Sv$ corresponding to the logarithm of the film speed and produced in the block $Sv$ in a manner known in the art. The output of adder 6' which represents a value $Bv + Sv$ is applied to one of the inputs of subtracter 7', to the other input of which is applied through switch SP", a digital signal $Tv$ corresponding to the logarithm of the preselected shutter speed and produced in block $Tv$ in a manner known in the art. The output of subtracterr 7', which represents a value of $Bv + Sv - Tv$ is applied to and stored in register 12'. In other words, the register 12' stores a signal corresponding to an exposure value or diaphragm value $Av$, because $Av = Bv + Sv - Tv$ in terms of photographic concept. When the number of pulses produced from circuit 10' has reached a level dependent upon the exposure value $Av$ as detected by the comparator 9', comparator 9' produces an output which energizes the solenoid of the second magnet $Mg_2$ to cancel the magnetic force of permanent magnet $Mg_2$, thereupon the arresting lever 330 is turned counter-clockwise to arrest the counter-clockwise rotating star wheel 319c. This turning movement of sector 318 also causes a downward movement of the control lever 329 which in turn causes a clockwise movement of diaphragm presetting ring 303, thereby the final angular position of ring 303 is determined in accordance with the object brightness level, preselected shutter speed and the sensitivity of the used film.

As the second latch lever 315 is turned clockwise, the spring powered mirror drive lever 311 is disengaged at the projection 311c from the latch lever pawl 315b, and is then turned counter-clockwise under the action of spring 311d in combination with the control lever 337 through the return control lever 336, causing the diaphragm drive lever 305 to be turned clockwise about shaft 306 through the extension 337b and extension 305c connection against the force of spring 305a, while moving the pin 304 which operates with the diaphragm blade drive ring in the lens aperture mechanism, thereby the size of the diaphragm aperture is varied from the maximum one to a value dependent upon the angular position of diaphragm presetting ring 303. At the same time, the hold switch SH is closed. As the control lever 337 is turned counter-clockwise, the mirror 338 is moved from its viewing position to its non-viewing position.

In response to the actuation of the shutter release button 347, the delay circuit 8' is rendered operative to provide a time interval, during which the lens aperture mechanism is adjusted and the mirror is set to the non-viewing position. At the termination of duration of this time interval, the solenoid of the third magnet $Mg_3$ is energized to cancel the magnetic force of magnet $Mg_3$, thereby the front curtain latch lever 333 is turned clockwise under the action of spring 333a to disengage the pawl of lever 333 from detect pin 334a, permitting gear 334 to turn counter-clockwise under the action of a not shown spring while rotating pinion 335 engaging therewith to effect the running off of the front curtain. After a time interval from the initiation of an exposure determined by the timing device 14' into which the preselected shutter speed is applied from the setting means $Tv$ through switch SP", the solenoid of the fourth magnet $Mg_4$ is energized to cancel the magnetic force of magnet $Mg_4$ to turn the rear curtain latch lever 340 clockwise under the action of spring 340b, thereby the detect pin 339a is disengaged from the pawl of lever 340, permitting the gear 339 to turn counter-clockwise under the action of a not shown spring while rotating the pinion 500 to effect the running off of the rear curtain, thereby the exposure is terminated. At the termination of rotation of gear 339, the detect pin 339a strikes one arm of transfer lever 341, causing lever 341 to turn counter-clockwise against the force of spring 341. Such a turning movement of lever 341 causes disengagement of mirror return control lever 336 from the projection 311b of drive lever 311 which in turn causes a clockwise turning movement of control lever 337 and causes a counter-clockwise turning movement of diaphragm drive lever 305. During this time, the mirror 338 is returned to the viewing position under the assistance of the return spring 338c, and the hold switch SH is set to the opened position. As the lever 305 is turned counter-clockwise, the pin 304 is moved to the initial position where the diaphragm blades are in the maximum open position.

After the exposure has been terminated, the film winding lever may be cocked to advance the film through the length of a frame and to set the shutter to the cocked position, while turning the shaft 308 in the counter-clockwise direction indicated by the arrow. During this time, the cam disk 309 and follower pin 310a connection causes a clockwise movement of the bell crank lever 310 which in turn causes a counter-clockwise movement of intermediate lever 307. The movement of lever 307 is transmitted to escapement 312 through the engagement with pin 312a, thereby escapement 312 is turned clockwise against the force of spring 312d, while turning the arm 327 clockwise about the shaft 322 in engagement with the escapement arm 312e to bring the sector 318 into latched engagement with the third latch lever pawl 316, turning the arresting lever 330 clockwise to disengage its pawl from the star wheel 319c, and turning the release lever 314 clockwise through the pin 312b and lever end 314e connection to bring the lever end 314a into engagement with the first latch lever pawl 313b. As a result, all of the shutter, diaphragm and mirror mechanisms are set to their cocked positions.

In order to make an exposure in the diaphragm preselection automatic exposure control mode, the camera operator turns the shutter setting dial A to place its symbol EE in registry with an index not shown, thereby switch ST and switch ST' cooperating with switch ST are closed. Next, the diaphragm ring 301 is turned to place a desired graduation of the diaphragm scale on the ring 301 in registry with index 302, thereby the cam lobe 301b is moved away from pin 304 causing to open switch SP together with switches SP" and SD. When the shutter button 347 is depressed to close switch $SR_1$, the solenoid of the first magnet $Mg_1$ is energized to cancel the magnetic force of magnet $Mg_1$, thereby the first latch lever pawl 313b is disengaged from the release lever end 314e to turn lever 314 counter-clockwise under the action of spring 314f. At this time, the exposure metering operation is terminated, because of the closure of switch SM. Such a counter-clockwise movement of release lever 314 results in disengagement of the third latch lever 316 from the gear sector 318, permitting the sector 318 to turn clockwise until the projection 303b of the presetting ring 303 abuts the projection 301a of ring 301, thereby the pulse signal forming circuit 10' produces a number of pulses corresponding to the preselected diaphragm value.

Responsive to the digital signals Bν and Sν from register 5' and film speed setting means, the adder 6' produces an output representative of the sum Bν + Sν which is then applied to one of the two inputs of subtracter 7', to the other input of which is applied the pulse signal representative of the Aν value from register 13'. The output of subtracter 7' which is representative of an exposure value or an exposure time, i.e., Tν + Bν + Sν − Aν in terms of signal magnitude is applied to register 12', and therefrom is directed through switch ST' to the timing device 14'. The counter-clockwise movement of release lever 314 also causes a clockwise movement of the second latch lever 315 to actuate the mirror drive lever 311, thereby the mirror and lens aperture mechanisms are operated and then the solenoid of the third magnet $Mg_3$ is energized to initiate an exposure. The subsequent operation proceeds in a manner similar to that shown in connection with the shutter preselection exposure control mode.

In order to make an exposure in the manual control mode, the operator turns the shutter setting dial A to place a desired shutter speed graduation in registry with the index, and then the diaphragm ring to place a desired diaphragm value graduation in registry with index 302, or the vice versa, thereby switches SP, SP", ST and ST' are opened. Next, the switch Sw is closed by depressing a not shown button. When the shutter button 347 is depressed to close switch $SR_1$, the solenoid of magnet $Mg_1$ is energized to disengage the lever pawl 313b from the lever end 314a, thereupon the lever 314 is turned counter-clockwise. Such a turning movement of lever 314 causes a counter-clockwise movement of the third latch lever 316, which in turn causes sector 318 to turn clockwise under the action of spring 303a which applies a force thereon through the intermediary of ring 303 and control lever 329, until the ring projection 303b abuts ring projection 301a. The subsequent operation proceeds in a manner similar to that shown in connection with the shutter pre-selection exposure control mode.

The apparatus of FIGS. 1 and 2 is provided with an indicator for indicating a suitable diaphragm value in conformance with the preselected shutter speed. The operation of the indicator is as follows. At first the diaphragm ring 301 is turned to place the symbol EE in registry with the index 302, thereby the projection 301a is brought into abutment with the projection 303b, and switches SP, SP" and SD are opened. Next the shutter dial A is turned to select a desired shutter speed, thereby switches ST and ST' are opened. Next, the indicator control button 501 is depressed to turn the lever 352 in the clockwise direction, thereby the third latch lever 316 is disengaged from the gear sector 318 and simultaneously switches SP', SH', SL and SL' are closed. Next, the operator turns the diaphragm ring 310 from the EE position one stop by one stop, causing the ring 303 to turn clockwise step by step. Such a stepwise movement of ring 303 causes a stepwise scanning movement of slide $Ra_1$ along the contact arrangement Ra. When the number of pulses produced from the pulse forming circuit 10' has reached the level dependent upon the preselected shutter speed as detected the comparator 9', the lamp L is energized to teach the operator that the diaphragm value graduation on ring 301 which is in alignment with the index 302 is suited for correct exposure with the preselected shutter speed.

It will be seen from the foregoing description that the present invention provides an automatic exposure control apparatus for a photographic camera of the type provided with the shutter preselection automatic exposure control range and with the shutter diaphragm preselection automatic exposure control range, in which the exposure control parameter setting means such as the diaphragm setting ring is associated with means for converting the mechanical displacement of the setting ring directly to an electrical digital signal controlling the shutter speed or aperture size, so that there is no need to use any analog-to-digital converter as connected between the exposure control parameter setting means and the exposure value computing means. The exclusion of the analog-to-digital converters which would be otherwise necessary results in reduction of the complexity of the exposure control apparatus structure and the bulk of the apparatus.

What is claimed is:

1. An exposure control apparatus comprising:
   (a) light measuring means which measures brightness information of an object and provides a digital signal proportional thereto as an output;
   (b) shutter speed setting means which provides a digital signal proportional to the shutter speed information as an output;
   (c) diaphragm means which provides a diaphragm aperture for obtaining a correct exposure corresponding to the input signals of the light measuring means and the shutter speed setting means;
   (d) diaphragm control signal forming means which is responsive to the diaphragm means and provides a digital signal corresponding to the diaphragm aperture provided by the diaphragm means;
   (e) computing means which receives the photographic information of the light measuring means and shutter speed setting means;
   (f) shutter control means which is connected to the shutter speed setting means and controls the shutter opening time in correspondence to the output of the shutter speed setting means;
   (g) comparing means which compares the digital output values of the diaphragm control signal forming means and the computing means and generates a signal when the output values coincide; and
   (h) arresting means which is operatively connected to the diaphragm means, the diaphragm control signal forming means and the comparing means, and stops the output of the diaphragm control signal forming means by the output signal of the comparing means to determine the opening position of the diaphragm means.

2. An exposure control apparatus according to claim 1, in which the diaphragm control signal forming means includes:
   (a) a sliding member which is operatively connected to the diaphragm means and slides in proportion to the aperture provided by the diaphragm means and exhibits a sliding amount corresponding to the output signals of the light measuring means and the shutter speed setting means, and
   (b) pulse generating means which has a group of switches composed of a plurality of switches which are set on or off by the sliding action of the sliding member and provides a digital signal in correspondence to the on and off condition of each of the switches.

3. An exposure control apparatus according to claim 1, wherein said arresting means is provided with a solenoid of a magnet to control said arresting means.

4. An exposure control apparatus according to claim 1 which further comprises:
   (a) diaphragm setting means having a diaphragm priority mode position and a diaphragm manual mode position,
   (b) releasing means, externally operable, being operatively connected to the diaphragm control signal forming means for making the diaphragm means operate in response to the manual operation of the diaphragm setting means; and
   (c) correct exposure indicating means which is operatively connected to the computing means and indicates a correct input information of the diaphragm setting means by taking into account the input information of the shutter speed setting means.

5. An exposure control apparatus for a camera capable of photographing with shutter information priority mode or aperture information priority mode selectively comprising:
   (a) light measuring means which measures brightness information of an object and provides a digital signal proportional thereto as the output;
   (b) shutter information setting means having a position for selectively providing shutter information as a digital signal, and a position for setting the shutter information automatically;
   (c) diaphragm setting means having a position for selectively providing diaphragm information as a digital signal, and a position for setting the diaphragm information automatically;
   (d) diaphragm means operatively connected to the diaphragm setting means, said diaphragm means opening the diaphragm corresponding to the selective position of the diaphragm setting means;
   (e) shutter means being operatively connected to the shutter information setting means for determining the shutter opening time in correspondence to the selective position of the means (b),
   (f) diaphragm control signal forming means which is operatively connected to the diaphragm means for producing a digital signal which determines a diaphragm aperture by the diaphragm means;
   (g) computing means which receives information from the light measuring means and the shutter information setting means and provides a correct exposure value corresponding to the selective mode as a digital signal;
   (h) a first switching means which controls the input information of the computing means from the shutter information setting means in association with the selective mode of the shutter information setting means;
   (i) comparing means being operatively connected to the diaphragm control signal forming means and the computing means for comparing the inputs of both means and generating a signal when the input signals coincide;
   (j) a second switching means which is operatively connected to the diaphragm means and the comparing means, and controls the input information of the compared means in correspondence to the selective mode of the releasing means and the diaphragm setting means;
   (k) shutter control means which is operatively connected to the shutter information setting means and the computing means for determining the shutter opening time in correspondence to the selective mode of the shutter information setting means;
   (l) a third switching means which is connected to the computing means and the shutter control means and is changed over in correspondence to the selective mode of the shutter information setting means; and
   (m) arresting means which is operatively connected to the diaphragm means, the diaphragm control signal forming means and the comparing means and stops the output of the diaphragm control signal forming means by the output of the comparing means and determines the opening position of the diaphragm means in correspondence to the digital value of the diaphragm control signal forming means.

* * * * *